(12) United States Patent
Arunachalam et al.

(10) Patent No.: US 9,679,159 B2
(45) Date of Patent: *Jun. 13, 2017

(54) MOBILE PRIVACY INFORMATION PROXY

(71) Applicant: INTERNATIONAL BUSINESS MACHINES CORPORATION, Armonk, NY (US)

(72) Inventors: Krishnarajan Arunachalam, Idappadi (IN); Adam S. Biener, Vestal, NY (US); Sunil Joshi, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/989,849

(22) Filed: Jan. 7, 2016

(65) Prior Publication Data
US 2016/0117525 A1    Apr. 28, 2016

Related U.S. Application Data

(63) Continuation of application No. 14/220,620, filed on Mar. 20, 2014, now Pat. No. 9,271,146.

(51) Int. Cl.
*H04W 12/02*   (2009.01)
*G06F 21/62*   (2013.01)
*H04L 29/06*   (2006.01)

(52) U.S. Cl.
CPC ...... *G06F 21/6245* (2013.01); *H04L 63/0281* (2013.01); *H04L 63/20* (2013.01); *H04W 12/02* (2013.01)

(58) Field of Classification Search
None
See application file for complete search history.

(56) References Cited

U.S. PATENT DOCUMENTS 7,613,721 B2    11/2009 Horvitz et al.
9,271,146 B2 *   2/2016 Arunachalam ....... H04W 12/02
(Continued)

FOREIGN PATENT DOCUMENTS

WO     0249380     6/2002
WO    2009079255   6/2009

OTHER PUBLICATIONS

Charles Web Debugging Proxy Application for Windows, Mac OS and Linux; retrieved from the Internet; URL http://www.charlesproxy.com/documentation/proxying/ssl-proxying; retrieved on Sep. 10, 2013; 2 pages.

(Continued)

*Primary Examiner* — Diane Mizrahi
(74) *Attorney, Agent, or Firm* — Schmeiser, Olsen & Watts; William H. Hartwell

(57) ABSTRACT

An approach is provided for managing data being transmitted from a mobile device. The mobile device receives a request from a user to initiate a transmission of data. The mobile device determines whether the data includes person or business-related sensitive information based on a format of the data, and if so, the mobile device determines a country in which the mobile device is currently located, determines a privacy policy of the country in which the mobile device is currently located, and determines whether the privacy policy applies to a type of the data corresponding to the format of the data; and if so, the mobile device notifies the user of the privacy policy of the country, identifies to the user the type of the data for which the privacy policy applies, and queries the user whether to transmit the data as requested by the user.

20 Claims, 4 Drawing Sheets

(56) References Cited

U.S. PATENT DOCUMENTS

| | | |
|---|---|---|
| 2003/0078053 A1 | 4/2003 | Abtin et al. |
| 2009/0102655 A1 | 4/2009 | Yi et al. |
| 2010/0250497 A1* | 9/2010 | Redlich .................. F41H 13/00 707/661 |
| 2013/0132854 A1* | 5/2013 | Raleigh ................ G06F 3/0482 715/738 |
| 2014/0188804 A1 | 7/2014 | Gokhale et al. |
| 2014/0287723 A1 | 9/2014 | Lafever et al. |
| 2015/0271666 A1 | 9/2015 | Arunachalam et al. |

OTHER PUBLICATIONS

Escudero-Pascual, et al.; "Role(s) of a Proxy in Location Based Services"; IEEE Proceeding of the International Symposium on Personal Indoor and Mobile Radio Communications (PIMRC 2002); Aug. 31, 2002; pp. 57-64.

Fawcett, Tyrell William; "Exfild: A Tool for the Detection of Data Exfiltration Using Entropy and Encryption Characteristics of Network Traffic"; thesis submitted to the Faculty of the University of Delaware in partial fulfillment of he requirements for the degree of Masters of Science in Electrical and Computer Engineering; Spring 2010; 138 pages.

Koodli, R.; IP Address Location Privacy and Mobile IPv6: Problem Statement (RFC4882); IP.com; IP.com No. IPCOM000153168D; Original Publication Date: May 1, 2007; IP.com Electronic Publication: May 26, 2007; 13 pages.

Kia, F., et al.; RADIUS Support for Proxy Mobile IPv6 (RFC6572); IP.com; IP.com No. IPCOM000218927D; Original Publication date Jun. 1, 2012; IP.com Electronic Publication: Jun. 12, 2012; 37 pages.

Office Action (Mail Date Jul. 8, 2015) for U.S. Appl. No. 14/220,620, filed Mar. 20, 2014.

Amendment filed Sep. 18, 2015 in response to Office Action (Mail Date Jul. 8, 2015) for U.S. Appl. No. 14/220,620, filed Mar. 20, 2014.

* cited by examiner

MOBILE PRIVACY INFORMATION PROXY

This application is a continuation application claiming priority to Ser. No. 14/220,620 filed Mar. 20, 2014, now U.S. Pat. No. 9,271,146, issued Feb. 23, 2016.

TECHNICAL FIELD

The present invention relates generally to managing sensitive data, and more specifically to applying privacy policies to data sent from mobile devices.

BACKGROUND

Many applications for mobile devices (e.g., banking, collaboration, and social networking) transmit sensitive data. Known mobile platforms employ proxy interceptors to monitor, filter, and change data sent from mobile devices, but the proxy interceptors lack a security management system that provides users with sufficient control over the transmission of sensitive data.

ExFILD: A Tool for the Detection of Data Exfiltration Using Entropy and Encryption Characteristics of Network Traffic by Tyrell William Fawcett, 2010 teaches a tool that determines the sensitivity of outbound data and alerts users when sensitive data is exiting a system by using entropy characteristics of network traffic.

BRIEF SUMMARY

A first embodiment of the present invention is a method, computer system and computer program product for managing data being transmitted from a mobile device. The mobile device receives a request from a user to initiate a transmission of data. The mobile device determines whether the data includes sensitive information based on a format of the data, and if so, the mobile device determines a country in which the mobile device is currently located, determines a privacy policy of the country in which the mobile device is currently located, and determines whether the privacy policy applies to a type of the data corresponding to the format of the data; and if so, the mobile device notifies the user of the privacy policy of the country, identifies to the user the type of the data for which the privacy policy applies, and queries the user whether to transmit the data as requested by the user.

A second embodiment of the present invention is a method, computer system and computer program product for managing data being transmitted from a mobile device. The mobile device receives a request from a user to initiate a transmission of data. The mobile device determines a country in which the mobile device is currently located. The mobile device determines a privacy policy of the country in which the mobile device is currently located. The mobile device determines a format of the data. The mobile device determines whether the privacy policy applies to a type of the data corresponding to the format of the data, and if so, the mobile device notifies the user of the privacy policy of the country, identifies to the user the type of the data for which the privacy policy applies, and queries the user whether to transmit the data as requested by the user.

Embodiments of the present invention provide a mobile privacy information proxy installed on a mobile device, which allows a user to have control over whether private data including sensitive information is transmitted from the mobile device based on the current location of the mobile device. By providing the control over whether the sensitive information is transmitted from the mobile device, the proxy makes the user more comfortable with using mobile device-based applications with private data.

DETAILED DESCRIPTION

Overview

Embodiments of the present invention provide a proxy installed on a mobile device which periodically downloads an updated location-based privacy policy from a centralized data store and applies the privacy policy to manage an attempted transmission of sensitive data from the mobile device. The privacy policy includes rules that identify data that is sensitive in a specific country and/or another political division. Applying the rules in the privacy policy to manage the transmission of the sensitive data is based on the current location of the mobile device (i.e., based on a country and/or another political division in which the mobile device is currently located). The privacy policy can be extended to include an enterprise's rules that manage the transmission of sensitive data.

System for Managing Data Transmitted from a Mobile Device

Figure 1:
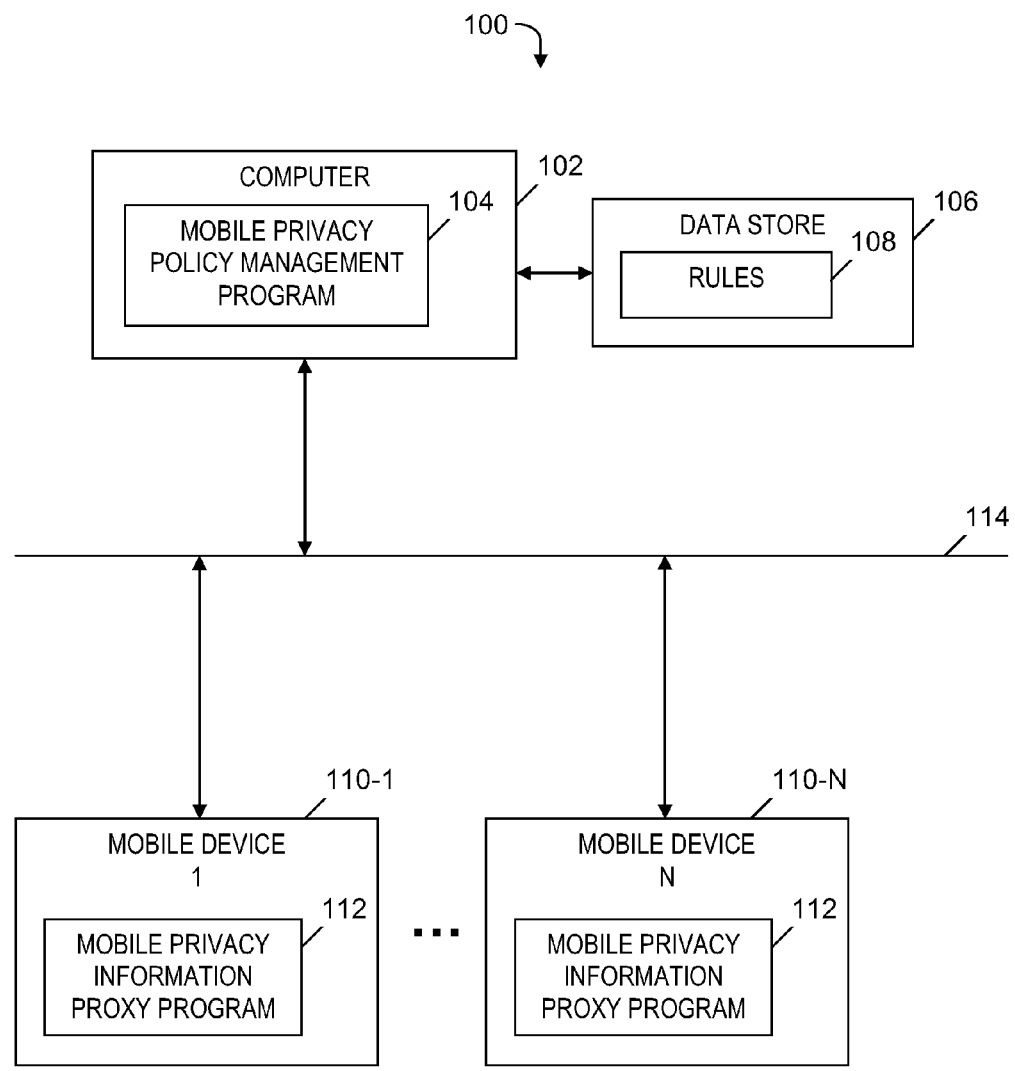
FIG. 1 is a block diagram of a system for managing data being transmitted from a mobile device, in accordance with embodiments of the present invention.

FIG. 1 is a block diagram of a system 100 for managing data being transmitted from a mobile device, in accordance with embodiments of the present invention. System 100 includes a computer 102, which executes a software-based mobile privacy policy management program 104. Computer 102 is coupled to a data store 106, which includes privacy rules 108. System 100 includes N mobile devices 110-1 . . . 110-N, where N is an integer greater than or equal to one. Each of the N mobile devices 110-1 . . . 110-N can be a smartphone, tablet computer, PDA, or another portable computing device.

Mobile privacy policy management program 104 is a server-side component that manages data in data store 106, which includes rules 108, privacy policies, categories, user profiles, locales, and countries, as described below.

Mobile privacy policy management program 104 stores privacy rules 108 in data store 106 and retrieves privacy rules 108 from data store 106. Mobile privacy policy management program 104 can add, update or delete rules 108 in data store 106. Mobile privacy policy management program 104 allows a user to provide a name of a rule, a regular expression that specifies a format of a category of data, and the associated category of data. In one embodiment, privacy rules 108 are included in a country-specific privacy policy that associates a country with a type (i.e., category) of data. Types of data include Social Security numbers, other national identification numbers that identify individuals who are citizens of and/or reside in a country, email addresses, mobile phone numbers, and account numbers, where the number and order of individual alphanumeric characters in a specific type of data conform to a specific format (i.e., template or pattern). Types of data can be classified by multiple levels of sensitivity of the data, which may include "sensitive private information" and "private information." For example, identification number Y which identifies individuals in country X is sensitive private information, and data store 106 includes a privacy rule 108 that associates country X with the identification number Y. Alternatively, privacy rules 108 provide privacy policies based on enterprises, states, provinces or other political divisions (other than countries), so that a privacy rule 108 associates an enterprise, state, province or other political division with a type of data.

Mobile privacy policy management program 104 can add, update or delete privacy policies, and allows a user to provide a name of a policy and its associated rules included in rules 108. A privacy policy managed by mobile privacy policy management program 104 includes a set of rules included in rules 108. Mobile privacy policy management program 104 distributes privacy policies to a registered mobile device included in mobile devices 110-1 . . . 110-N by utilizing a policy distributor function, which enables the registered mobile device to request that computer 102 retrieve a privacy policy from data store 106, where the retrieved privacy policy is associated in data store 106 with a country in which the registered mobile device is currently located. A location service (not shown) provides the current location of the registered mobile device.

A background service (not shown) executing on the registered mobile device periodically determines whether the registered mobile device has not yet downloaded from data store 106 an update for the privacy policy for the country in which the registered mobile device is currently located. If the registered mobile device has not yet downloaded the update, then the background service automatically downloads the update from data store 106 to the registered mobile device.

Mobile privacy policy management program 104 can add, update or delete categories (i.e., types) of data, and allows a user to manage information in the categories, such as mobile phone numbers, Social Security numbers and email addresses.

Mobile privacy policy management program 104 receives and manages requests from users to register mobile devices 110-1 . . . 110-N. Mobile privacy policy management program 104 receives information for the aforementioned user profiles from the users who send requests to register mobile devices 110-1 . . . 110-N.

Mobile privacy policy management program 104 can add, update or delete information about locales, and allows a user to provide names and codes for locales. A locale specifies a user's language, country and special preferences that the user wants in a user interface, including the language that the user prefers for alerts and other notifications presented by system 100.

Mobile privacy policy management program 104 can add, update or delete information about countries in which mobile devices 110-1 . . . 110-N are currently located, and allows a user to provide a name of a country, a code (e.g., International Organization for Standardization (ISO) code) for the country, and a locale and privacy policy associated with the country.

Privacy rules 108 also associate types of data with respective formats of data. The formats of data correspond to respective types of data. For example, a privacy rule 108 associates a Social Security number with the format DDD-DD-DDDD, where each D can be any digit in the sequence 0 . . . 9.

Each of the mobile devices 110-1 . . . 110-N includes a central processing unit (CPU) (not shown), tangible data storage device(s) (not shown) and a memory (not shown). Each of the mobile devices 110-1 . . . 110-N utilizes the CPU to execute a software-based mobile privacy information proxy program 112 (i.e. computer program instructions) stored in the tangible storage device(s) via the memory to manage data being transmitted from the mobile device.

Mobile privacy information proxy program 112 determines the country or other political division in which mobile device 110-1 is located by receiving a location of mobile device 110-1 from a software-based location providing utility (not shown) (e.g., a global positioning system (GPS)-based utility). Mobile device 110-1 utilizes the CPU to execute the location providing utility stored in the tangible storage device(s) via the memory to determine the location of the mobile device. In one embodiment, the location received from the location providing utility includes latitude and longitude coordinates.

Mobile privacy information proxy program 112 includes a privacy rule parser that parses documents (i.e., policy files) that include privacy rules of a privacy policy retrieved from rules 108. In one embodiment, mobile privacy information proxy program 112 downloads a country-specific policy file in response to mobile device 110-1 changing its current location from one country to another country. The downloaded country-specific policy file corresponds to the country in which mobile device 110-1 is currently located. Data store 106 includes policy files for countries in a one-to-one correspondence. Alternatively, data store 106 includes policy files for finer levels of granularity, such as one policy file for each state or province.

Each of the other mobile devices included in mobile devices 110-1 . . . 110-N includes the same structure and provide the same functionality as the above-described mobile device 110-1.

Mobile devices 110-1 . . . 110-N are in communication with computer 102 via a computer network 114, which can be the Internet. Each of mobile devices 110-1 . . . 110-N is configured, using its native networking settings, to forward data traffic through the locally-running mobile privacy information proxy program 112 before the traffic is transmitted through network 114.

Internal and external components of mobile device 102-1 are further described below relative to FIG. 6. The functionality of components of system 100 is further described below in the discussion relative to FIG. 2, FIG. 3, FIG. 4, and FIG. 5.

Figure 2:
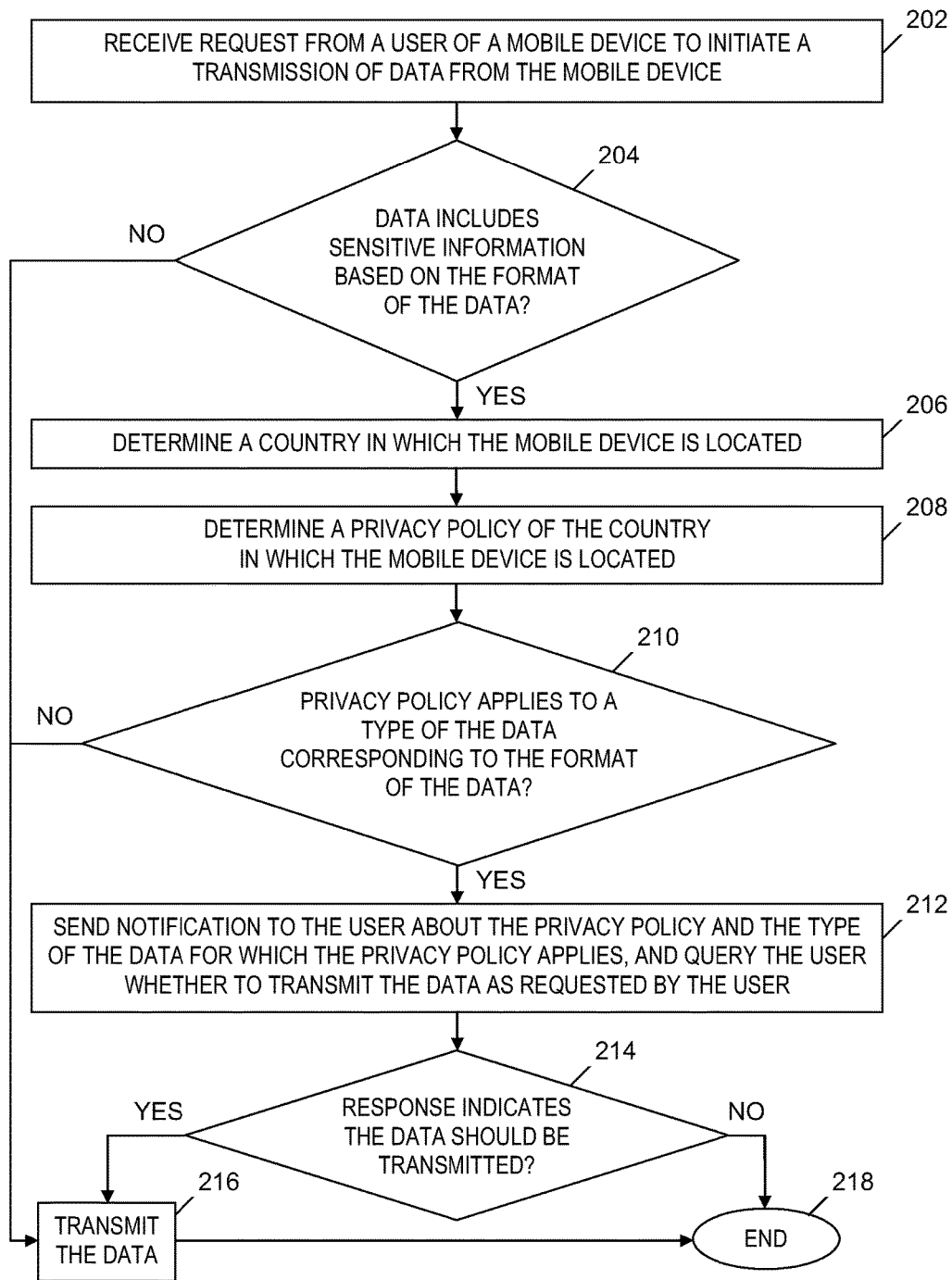
FIG. 2 is a flowchart of a mobile privacy information proxy program executed in a mobile device included in the system of FIG. 1, in accordance with embodiments of the present invention.

FIG. 2 is a flowchart of mobile privacy information proxy program 112 (see FIG. 1) executed in a mobile device included in system 100 of FIG. 1, in accordance with embodiments of the present invention. Although the steps in FIG. 2 discussed below describe mobile device 110-1 in FIG. 1, the process may be extended to include any of the N mobile devices depicted in FIG. 1. In step 202, mobile privacy information proxy program 112 (see FIG. 1) receives a request from a user of mobile device 110-1 (see FIG. 1) to initiate a transmission of data from mobile device 110-1 (see FIG. 1). Hereinafter, in the discussion of FIG. 2, the data whose transmission is initiated by the request received in step 202 is referred to simply as "the data." The request includes a submission of the data by a user through an application executing on mobile device 110-1 (see FIG. 1).

In step 204, mobile privacy information proxy program 112 (see FIG. 1) intercepts the data, scans the data, determines the format of the data, and determines whether the data includes sensitive information based on the format of the data. If mobile privacy information proxy program 112 (see FIG. 1) determines that the data includes sensitive information based on the format of the data, then the Yes branch of step 204 is taken and step 206 is performed. The data includes sensitive information if the format of the data matches a predetermined template that specifies sensitive information. For example, the data includes sensitive information if the format of the data matches a template that specifies a Social Security number.

Sensitive information can include (1) a Social Security number or another number provided by a country or other political division or an enterprise which is used to identify a person, (2) mobile phone number, (3) email address, or (4) a financial account number, such as a credit card account number, bank account number or investment account number. Disclosure of or unauthorized access to sensitive information can adversely affect the privacy, welfare, or security of a person, business, or a political division such as a country, state, etc.

In step 206, mobile privacy information proxy program 112 (see FIG. 1) determines a country in which mobile device 110-1 (see FIG. 1) is currently located.

In step 208, mobile privacy information proxy program 112 (see FIG. 1) determines a privacy policy of the country determined in step 206 (i.e., the country in which the mobile device is currently located). Mobile privacy information proxy program 112 (see FIG. 1) periodically downloads updates to the privacy policies of countries stored in data store 106 (see FIG. 1), which includes the privacy policy determines in step 208. As one alternative, mobile privacy information proxy program 112 (see FIG. 1) requests in step 208 that mobile privacy policy management program 104 (see FIG. 1) perform a lookup in data store 106 (see FIG. 1) to find and retrieve one or more of the rules 108 (see FIG. 1), which are associated with the country determined in step 206. The retrieved rule(s) included in rules 108 (see FIG. 1) comprise the aforementioned privacy policy. As another alternative, mobile privacy information proxy program 112 (see FIG. 1) determines the privacy policy by retrieving rule(s) stored in mobile device 110-1 (see FIG. 1) that are associated with the country determined in step 206, where the mobile privacy information proxy program 112 (see FIG. 1) retrieved the rule(s) from data store 106 (see FIG. 1) in step 206, in response to mobile privacy information proxy program 112 (see FIG. 1) determining that mobile device 110-1 (see FIG. 1) moved from another country to the country determined in step 206.

Alternative embodiments utilize variations of steps 206 and 208 to determine the current location of mobile device 110-1 (see FIG. 1) in a political division other than a country (e.g., a state) or at the location of an enterprise, and to determine the privacy policy of the other political division or the enterprise.

In step 210, mobile privacy information proxy program 112 (see FIG. 1) determines a type of the data and determines whether the privacy policy determined in step 208 applies to the type of the data. If mobile privacy information proxy program 112 (see FIG. 1) determines in step 210 that the privacy policy applies to the type of the data, then the Yes branch of step 210 is taken and step 212 is performed. The type of the data corresponds to the aforementioned format of the data. In one embodiment, mobile privacy information proxy program 112 (see FIG. 1) determines the privacy policy applies to the type of data by determining the format of the data matches a regular expression or another pattern included in the privacy policy.

In step 212, mobile privacy information proxy program 112 (see FIG. 1) sends a notification to the user to alert the user of a risk associated with transmitting the data which includes sensitive information according to the privacy policy determined in step 208. The notification includes the privacy policy determined in step 208 and the type of the data determined in step 210 (i.e., the type of the data for which the privacy policy applies). Also in step 212, mobile privacy information proxy program 112 (see FIG. 1) sends a query to the user. The query asks the user whether the data should be transmitted as had been previously requested by the user (i.e., whether to transmit the data according to the request received in step 202). In responding the query, the user has the option of preventing the data from being transmitted or allowing the data to be transmitted.

In step 214, mobile privacy information proxy program 112 (see FIG. 1) receives a response to the query sent in step 212 and determines whether the response authorizes a transmission of the data according to the request received in step 202. If mobile privacy information proxy program 112 (see FIG. 1) determines that the response authorizes the transmission of the data according to the request received in step 202, then the Yes branch of step 214 is taken and step 216 is performed.

In step 216, mobile privacy information proxy program 112 (see FIG. 1) transmits the data according to the request received in step 202. Following step 216, the process of FIG. 2 ends at step 218.

Returning to step 214, if mobile privacy information proxy program 112 (see FIG. 1) determines that the response to the query sent in step 212 does not authorize the transmission of the data, then the No branch of step 214 is taken, mobile privacy information proxy program 112 (see FIG. 1) prevents the transmission of the data from mobile device 110-1 (see FIG. 1), and the process of FIG. 2 ends at step 218.

Returning to step 210, if mobile privacy information proxy program 112 (see FIG. 1) determines that the privacy policy does not apply to the type of the data corresponding to the format of the data, then the No branch of step 210 is taken, and the process continues with step 216 (i.e., the mobile privacy information proxy program 112 (see FIG. 1) transmits the data), as described above, and subsequently ends at step 218.

Returning to step 204, if mobile privacy information proxy program 112 (see FIG. 1) determines that the data does not include sensitive information based on the format of the data, then the No branch of step 204 is taken and the process continues with step 216 (i.e., the mobile privacy information proxy program 112 (see FIG. 1) transmits the data), as described above, and subsequently ends at step 218.

In one embodiment, steps 212 and 214 are replaced with a step that includes mobile privacy information proxy program 112 (see FIG. 1) preventing the transmission of the data based on the determination in step 210 that the privacy policy applies to the type of the data, and mobile privacy information proxy program 112 (see FIG. 1) alerting the user that the transmission of the data, as requested by the user, was prevented.

In an alternate embodiment, step 204 is modified to be a process step rather than a decision step, where the process step includes mobile privacy information proxy program 112 (see FIG. 1) intercepting the data. In the alternate embodiment, between step 208 and step 210, a step is added in which mobile privacy information proxy program 112 (see FIG. 1) determines the format of the data.

Figure 3:
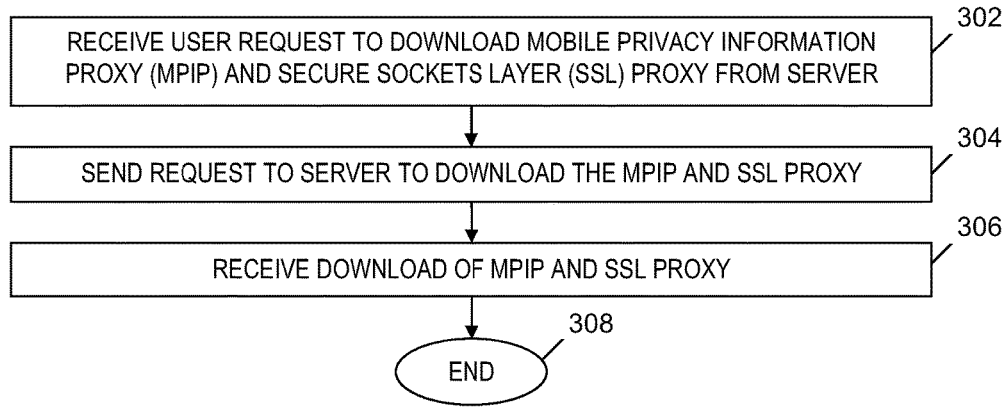
FIG. 3 is a flowchart of downloading the mobile privacy information proxy program to a mobile device in the system of FIG. 1, in accordance with embodiments of the present invention.

FIG. 3 is a flowchart of downloading the mobile privacy information proxy program 112 (see FIG. 1) to mobile device 110-1 (see FIG. 1), in accordance with embodiments of the present invention. The process of FIG. 3 is performed prior to the process of FIG. 2. In step 302, mobile device 110-1 (see FIG. 1) receives a user request to download mobile privacy information proxy program 112 (see FIG. 1) (MPIP) and a Secure Sockets Layer (SSL) proxy (not shown) from a server (i.e., computer 102 in FIG. 1). In step 304, mobile device 110-1 (see FIG. 1) sends the request received in step 302 to computer 102 (see FIG. 1) to download the MPIP and the SSL proxy. Mobile privacy policy management program 104 (see FIG. 1) executing in computer 102 sends the MPIP and the SSL proxy to mobile device 110-1 (see FIG. 1) as a download. In step 306, mobile device 110-1 (see FIG. 1) receives the download of MPIP and the SSL proxy. After step 306, mobile device 110-1 executes the MPIP and the SSL proxy. The SSL proxy manages requests and responses for mobile device 110-1 (see FIG. 1) that use SSL encryption. The MPIP manages requests from mobile device 110-1 (see FIG. 1) that use SSL encryption by utilizing the SSL proxy. An example of the SSL proxy downloaded in step 306 is the SSL proxy feature in Charles, a web proxy application offered by XK72 Limited, located in Auckland, New Zealand. The process of FIG. 3 ends at step 308.

Figure 4:
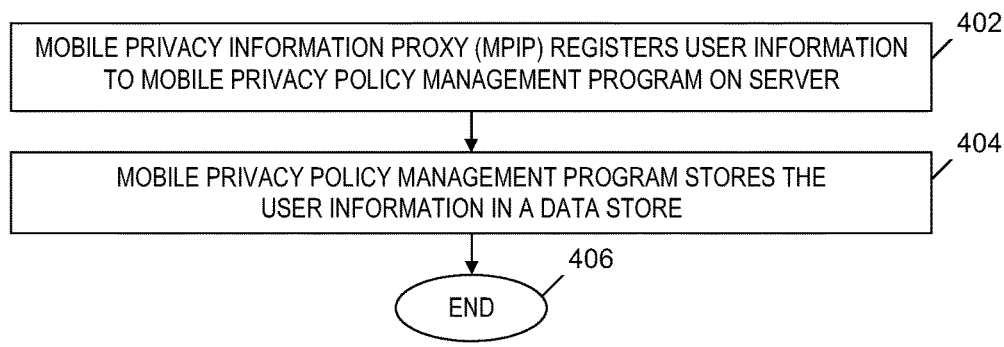
FIG. 4 is a flowchart of registering a mobile device running the mobile information proxy program executed in the system of FIG. 1, in accordance with embodiments of the present invention.

FIG. 4 is a flowchart of registering mobile device 110-1 (see FIG. 1) running the mobile information proxy program 112 (see FIG. 1) executed in the system of FIG. 1, in accordance with embodiments of the present invention. The process of FIG. 4 is performed after a completion of the process of FIG. 3 and after mobile device 110-1 (see FIG. 1) starts executing mobile privacy information proxy program 112 (see FIG. 1), and is performed before the process of FIG. 2. In step 402, mobile privacy information proxy program 112 (see FIG. 1) registers user information (i.e., information about a user of mobile device 110-1 (see FIG. 1)) to mobile privacy policy management program 104 (see FIG. 1), which is running on a server (i.e., computer 102 in FIG. 1). In step 404, mobile privacy management program 104 (see FIG. 1) stores the user information in data store 106 (see FIG. 1). The process of FIG. 4 ends at step 406.

Figure 5:
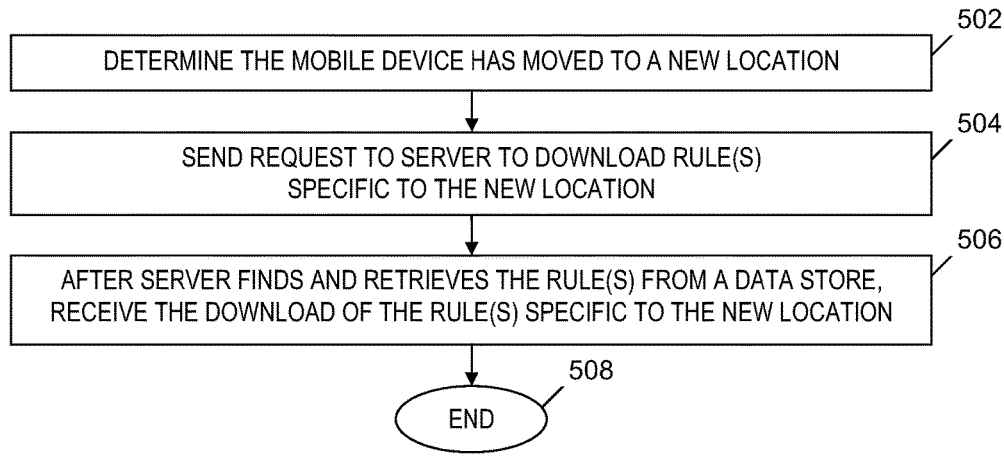
FIG. 5 is a flowchart of downloading location-specific rules of a privacy policy to a mobile device in the system of FIG. 1, in accordance with embodiments of the present invention.

FIG. 5 is a flowchart of downloading location-specific rules 108 (see FIG. 1) of a privacy policy to mobile device 110-1 (see FIG. 1) in the system of FIG. 1, in accordance with embodiments of the present invention. In step 502, mobile privacy information proxy program 112 (see FIG. 1) determines mobile device 110-1 (see FIG. 1) has moved from one location to a new location so that as a result of the move, mobile device 110-1 (see FIG. 1) has changed its location from one country to a new country. Mobile privacy information proxy program 112 (see FIG. 1) determines the current location of mobile device 110-1 and the country in which mobile device 110-1 (see FIG. 1) is currently located by receiving the current location of mobile device 110-1 from a GPS-based utility or another type of location providing utility (not shown).

In step 504, mobile privacy information proxy program 112 (see FIG. 1) sends a request to computer 102 (see FIG. 1) to request that mobile privacy policy management program 104 (see FIG. 1) running on computer 102 download a set of rule(s) 108 (see FIG. 1) specific to the new country (i.e., rule(s) associated with the new country in a record in data store 106 in FIG. 1). After step 504 and prior to step 506, mobile privacy policy management program 104 running on computer 102 (see FIG. 1) finds and retrieves the set of rule(s) 108 (see FIG. 1) from data store 106 (see FIG. 1). In step 506, mobile privacy information proxy program 112 (see FIG. 1) receives the download of the set of rule(s) 108 (see FIG. 1) specific to the new country. The process of FIG. 5 ends at step 508.

In other embodiments, the process of FIG. 5 is modified so that the new location mentioned above indicates mobile device 110-1 (see FIG. 1) has moved from one political division (other than a country) to a new political division (other than a country), and requests a download of rule(s) 108 (see FIG. 1) specific to the new political division.

EXAMPLES

An example of privacy rule 108 (see FIG. 1) is stored in the form of an Extensible Markup Language (XML) document, which includes the following tags:

<rule> is the root tag of the privacy rule 108 (see FIG. 1)

<rule-name> is a tag that includes the name of the privacy rule 108 (see FIG. 1)

<regular-expression> is a tag that includes a regular expression to be used while applying the privacy rule 108 (see FIG. 1) to data (see step 210, described below), which verifies that the data includes sensitive information based on the location of the mobile device 110-1 (see FIG. 1)

<category> is a tag that includes a category to which the privacy rule 108 (see FIG. 1) belongs, which specifies the type of the data to which the privacy rule 108 (see FIG. 1) is applied, and which has an attribute 'policy-type', which specifies the type of the category. For example, 'email' is a category which has the 'policy-type' of "sensitive private information."

<locale> is a tag that specifies a locale of users for whom the privacy rule 108 (see FIG. 1) is associated. The locale determines how alerts resulting from the process of FIG. 2 will be presented to the users. For example, a privacy rule 108 (see FIG. 1) with a <locale> specifying en_US (i.e., U.S. English) indicates that an alert is presented in U.S. English.

<country> is a tag that identifies the country associated with the privacy rule 108 (see FIG. 1) (i.e., the country in which the mobile device 110-1 (see FIG. 1) must be currently located if the privacy rule 108 (see FIG. 1) is applied).

An example of a privacy rule 108 (see FIG. 1) in XML format for validating a United States Social Security number is presented below. The regular expression used for the rule presented below matches a Social Security number (ssn) in the format DDD-DD-DDDD, where D represents a digit in the sequence 0 . . . 9.

<rule>
<rule-name>ssn_management</rule-name>
<regular-expression><![CDATA[^\d{3}-\d{2}-\d{4}$]]></regular-expression>
<category policy-type="spi">ssn</category>

```
    <locale> en_us</locale>
    <country>us</country>
    </rule>
```

An example of a privacy rule 108 (see FIG. 1) in XML format for validating a mobile phone number is presented below. The regular expression used for the rule presented below matches a hyphen-separated United States phone number in the format ANN-NNN-NNNN, where A is a digit in the sequence 2 . . . 9 and N is a digit in the sequence 0 . . . 9.

```
    <rule>
    <rule-name>mobile_phone_number_management</rule-name>
    <regular-expression><![CDATA[^[2-9]\d{2}-\d{3}-\d{4}$]]></regular-
    expression>
    <category policy-type="spi">mobile_phone</category>
    <locale> en_us</locale>
    <country>us</country>
    </rule>
```

An example of a privacy rule 108 (see FIG. 1) in XML format for validating an email address is presented below. The regular expression used for the rule presented below matches an email address format whose top level domain is between two and four characters long, but does not check the specific domain against a list.

```
    <rule>
    <rule-name>email_management</rule-name>
    <regular-expression><![CDATA[^[\w-\.]+@([\w-]+\.)+[\w-]{2,4}$]]>
    </regular-expression>
    <category policy-type="spi">email</category>
    <locale> en_us</locale>
    <country>us</country>
    </rule>
```

Computer System

Figure 6:
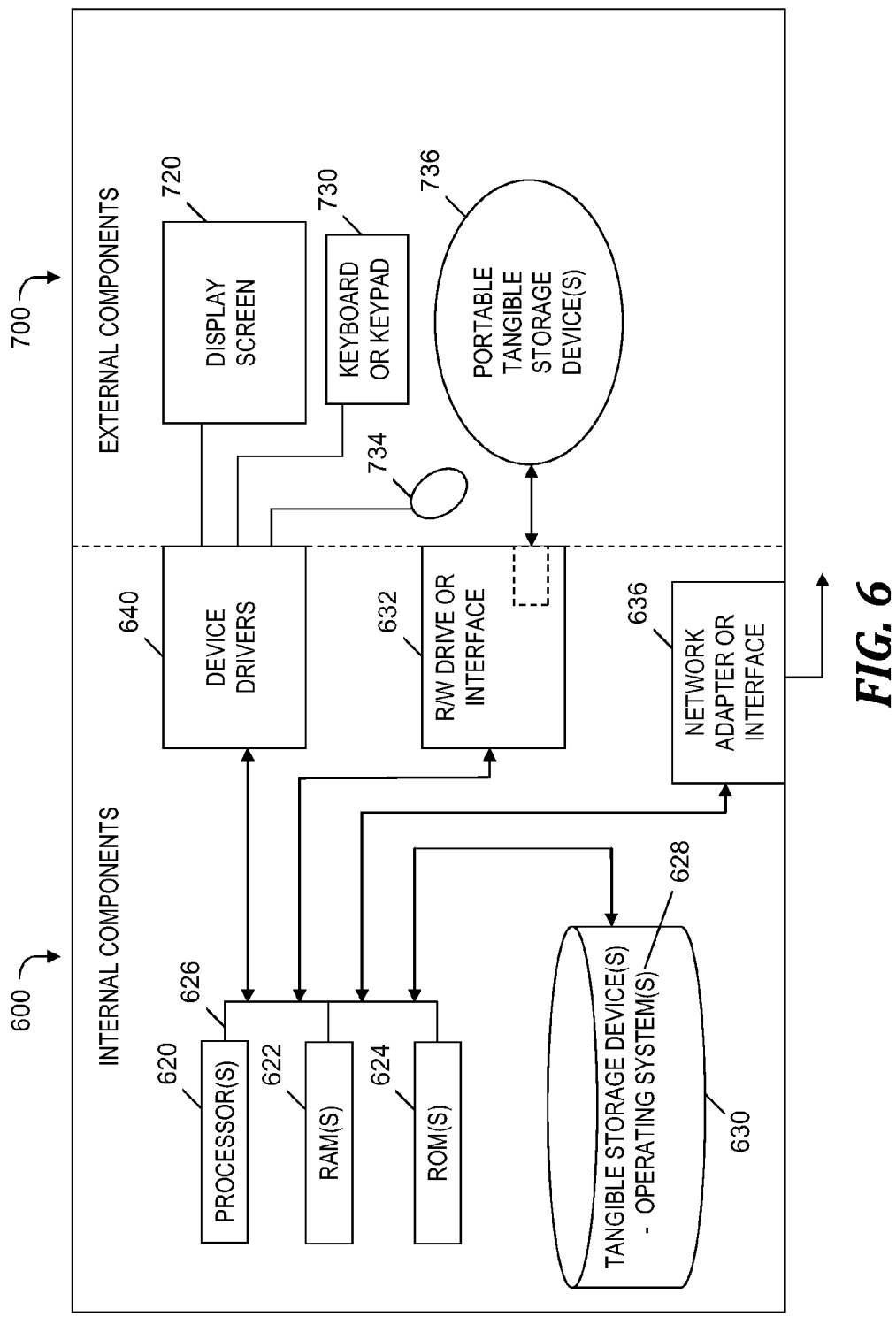
FIG. 6 is a block diagram of components of a mobile device included in the system of FIG. 1 for managing data being transmitted from the mobile device, in accordance with embodiments of the present invention.

FIG. 6 is a block diagram of components of mobile device 110-1 included in the system of FIG. 1 for managing data being transmitted from the mobile device, in accordance with embodiments of the present invention. Mobile device 110-1 (see FIG. 1) includes sets of internal components 600 and external components 700 illustrated in FIG. 6. The set of internal components 600 includes one or more processors 620, one or more computer-readable random access memories (RAMs) 622 and one or more computer-readable read-only memories (ROMs) 624 on one or more buses 626, a plurality of mobile operating systems 628 and one or more computer-readable storage devices 630. The operating systems 628 and program instructions 112 (for mobile device 110-1 in FIG. 1) are stored on one or more of the respective computer-readable storage devices 630 for execution by one or more of the respective processors 620 via one or more of the respective RAMs 622 (which typically include cache memory). In the illustrated embodiment, each of the computer-readable storage devices 630 is a magnetic disk storage device of an internal hard drive. Alternatively, each of the computer-readable storage devices 630 is a semiconductor storage device such as ROM 624, erasable programmable read-only memory (EPROM), flash memory or any other computer-readable storage device that can store but does not transmit a computer program and digital information.

The set of internal components 600 also includes a read/write (R/W) drive or interface 632 to read from and write to one or more portable tangible computer-readable storage devices 736 that can store but do not transmit a computer program, such as a CD-ROM, DVD, memory stick, magnetic tape, magnetic disk, optical disk or semiconductor storage device. The program instructions 112 (for mobile device 110-1 in FIG. 1) can be stored on one or more of the respective portable tangible computer-readable storage devices 736, read via the respective R/W drive or interface 632 and loaded into the respective hard drive or semiconductor storage device 630. The terms "computer-readable storage device" and "computer-readable storage devices" do not mean signal propagation media such as copper cables, optical fibers and wireless transmission media.

The set of internal components 600 also includes a network adapter or interface 636 such as a transmission control protocol/Internet protocol (TCP/IP) adapter card or wireless communication adapter (such as a 4G wireless communication adapter using orthogonal frequency-division multiple access (OFDMA) technology). The program 112 (for mobile device 110-1 in FIG. 1) can be downloaded to mobile device 110-1 (see FIG. 1) from an external computer or external computer-readable storage device via a network (for example, the Internet, a local area network or other, wide area network or wireless network) and network adapter or interface 636. From the network adapter or interface 636, the program 112 (see FIG. 1) is loaded into the respective hard drive or semiconductor storage device 630. The network may comprise copper wires, optical fibers, wireless transmission, routers, firewalls, switches, gateway computers and/or edge servers.

The set of external components 700 includes a display screen 720, a keyboard or keypad 730, and a computer mouse or touchpad 734. The set of internal components 600 also includes device drivers 640 to interface to display screen 720 for imaging, to keyboard or keypad 730, to computer mouse or touchpad 734, and/or to the display screen for pressure sensing of alphanumeric character entry and user selections. The device drivers 640, R/W drive or interface 632 and network adapter or interface 636 comprise hardware and software (stored in storage device 630 and/or ROM 624.

The program 112 (see FIG. 1) can be written in various programming languages (such as C++) including low-level, high-level, object-oriented or non-object-oriented languages. Alternatively, the functions of program 112 (see FIG. 1) can be implemented in whole or in part by computer circuits and other hardware (not shown).

Based on the foregoing, a computer system, method and program product have been disclosed for managing data being transmitted from a mobile device. However, numerous modifications and substitutions can be made without deviating from the scope of the present invention. Therefore, the present invention has been disclosed by way of example and not limitation.

What is claimed is:

1. A method of managing data being transmitted from a mobile device, the method comprising the steps of:
   the mobile device receiving a request from a user to initiate a transmission of data;
   the mobile device determining whether the data includes sensitive information based on a format of the data, and if so,
   the mobile device determining a country in which the mobile device is currently located, the mobile device determining a privacy policy of the country in which the mobile device is currently located, the sensitive information being information whose disclosure or unauthorized access adversely affects privacy, welfare, or security of a person or a business, and the mobile device determining whether the privacy policy applies to a type of the data corresponding to the format of the data; and if so, the mobile device notifying the user of the privacy policy of the country, identifying to the user the type of the data for which the privacy policy applies, and querying the user whether to transmit the data as requested by the user.

2. The method of claim 1, further comprising the steps of:
the mobile device determining the mobile device has moved from the country to a second country, and in response, determining a new privacy policy of the second country;

subsequent to the step of determining the mobile device has moved to the second country, the mobile device receiving a request from the user to initiate a second transmission of the data; and the mobile device determining the new privacy policy applies to the type of the data corresponding to the format of the data, and in response, notifying the user of the new privacy policy of the second country, identifying to the user the type of the data for which the new privacy policy applies, and querying the user whether to transmit the data in the second transmission as requested by the user.

3. The method of claim 1, further comprising the steps of:
the mobile device periodically determining whether an update exists for the privacy policy of the country in which the mobile device is currently located; and in response to the step of periodically determining and prior to the step of determining the privacy policy, the mobile device determining the update exists and downloading the update for the privacy policy, wherein the step of determining the privacy policy includes updating the privacy policy by the downloaded update.

4. The method of claim 1, further comprising the steps of:
the mobile device determining the format of the data;
the mobile device retrieving a rule of the privacy policy, the rule associating the country and the type of the data with a regular expression data pattern;
the mobile device determining the format of the data matches the regular expression data pattern; and
based on the format of the data matching the regular expression data pattern, the mobile device determining the privacy policy applies to the type of the data.

5. The method of claim 4, wherein the type of the data in the rule includes an attribute specifying a level of sensitivity of the data.

6. The method of claim 4, wherein the rule further associates the country and the type of the data with a locale specifying a language used in the step of notifying the user of the privacy policy.

7. The method of claim 1, wherein the sensitive information includes a national identification number, a telephone number, an email address, or a financial account number.

8. A computer program product for managing data being transmitted from a mobile device, the computer program product comprising:
one or more computer-readable storage devices and program instructions stored on the one or more storage devices, the one or more computer-readable storage devices not being one or more signals or signal propagation media, and the program instructions being executed by one or more hardware processors, the program instructions comprising:

program instructions to receive a request from a user to initiate a transmission of data;

program instructions to determine whether the data includes sensitive information based on a format of the data, and if so, determine a country in which the mobile device is currently located, determine a privacy policy of the country in which the mobile device is currently located, the sensitive information being information whose disclosure or unauthorized access adversely affects privacy, welfare, or security of a person or a business, and determine whether the privacy policy applies to a type of the data corresponding to the format of the data; and program instructions to, if the privacy policy applies to the type of the data corresponding to the format of the data, notify the user of the privacy policy of the country, identify to the user the type of the data for which the privacy policy applies, and query the user whether to transmit the data as requested by the user.

9. The computer program product of claim 8, further comprising:
program instructions, stored on the one or more storage devices, to determine the mobile device has moved from the country to a second country, and in response, determine a new privacy policy of the second country;

program instructions, stored on the one or more storage devices, to receive, subsequent to determining the mobile device has moved to the second country, a request from the user to initiate a second transmission of the data; and program instructions, stored on the one or more storage devices, to determine the new privacy policy applies to the type of the data corresponding to the format of the data, and in response, notify the user of the new privacy policy of the second country, identify to the user the type of the data for which the new privacy policy applies, and query the user whether to transmit the data in the second transmission as requested by the user.

10. The computer program product of claim 8, further comprising:
program instructions, stored on the one or more storage devices, to periodically determine whether an update exists for the privacy policy of the country in which the mobile device is currently located; and program instructions, stored on the one or more storage devices, to determine, in response to periodically determining whether the update exists for the privacy policy by the program instructions to periodically determine whether the update exists and prior to determining the privacy policy by the program instructions to determine the privacy policy, the update exists and download the update for the privacy policy, wherein the program instructions to determine the privacy policy update the privacy policy by the downloaded update.

11. The computer program product of claim 8, further comprising:
program instructions, stored on the one or more storage devices, to determine the format of the data;

program instructions, stored on the one or more storage devices, to retrieve a rule of the privacy policy, the rule associating the country and the type of the data with a regular expression data pattern;

program instructions, stored on the one or more storage devices, to determine the format of the data matches the regular expression data pattern; and program instructions, stored on the one or more storage devices, to determine, based on the format of the data matching the regular expression data pattern, the privacy policy applies to the type of the data.

12. The computer program product of claim 11, wherein the type of the data in the rule includes an attribute specifying a level of sensitivity of the data.

13. The computer program product of claim 11, wherein the rule further associates the country and the type of the data with a locale specifying a language used by the program instructions to notify the user of the privacy policy.

14. The computer program product of claim 8, wherein the sensitive information includes a national identification number, a telephone number, an email address, or a financial account number.

15. A computer system for managing data being transmitted from the computer system comprising:
   a mobile device;
   a central processing unit (CPU) included in the mobile device;
   a memory coupled to the CPU and included in the mobile device; and
   a computer readable storage device coupled to the CPU;
   first program instructions to receive a request from a user to initiate a transmission of data;
   second program instructions to determine whether the data includes sensitive information based on a format of the data, and if so,
      third program instructions to determine a country in which the mobile device is currently located, determine a privacy policy of the country in which the mobile device is currently located, the sensitive information being information whose disclosure or unauthorized access adversely affects privacy, welfare, or security of a person or a business, and determine whether the privacy policy applies to a type of the data corresponding to the format of the data; and if so,
      fourth program instructions to notify the user of the privacy policy of the country, identify to the user the type of the data for which the privacy policy applies, and query the user whether to transmit the data as requested by the user,
   wherein the first, second, third, and fourth program instructions are stored on the computer readable storage device for execution by the CPU via the memory.

16. The computer system of claim 15, further comprising:
   fifth program instructions to determine the mobile device has moved from the country to a second country, and in response, determine a new privacy policy of the second country;
   sixth program instructions to receive, subsequent to determining the mobile device has moved to the second country, a request from the user to initiate a second transmission of the data; and
   seventh program instructions to determine the new privacy policy applies to the type of the data corresponding to the format of the data, and in response, notify the user of the new privacy policy of the second country, identify to the user the type of the data for which the new privacy policy applies, and query the user whether to transmit the data in the second transmission as requested by the user,
   wherein the fifth, sixth, and seventh program instructions are stored on the computer readable storage device for execution by the CPU via the memory.

17. The computer system of claim 15, further comprising:
   fifth program instructions to periodically determine whether an update exists for the privacy policy of the country in which the mobile device is currently located; and
   sixth program instructions to, in response to periodically determining whether the update exists for the privacy policy of the country and prior to determining the privacy policy, determine the update exists and download the update for the privacy policy,
   wherein determining the privacy policy by the third program instructions includes updating the privacy policy by the downloaded update, and
   wherein the fifth and sixth program instructions are stored on the computer readable storage device for execution by the CPU via the memory.

18. The computer system of claim 15, further comprising:
   fifth program instructions to determine the format of the data;
   sixth program instructions to retrieve a rule of the privacy policy, the rule associating the country and the type of the data with a regular expression data pattern;
   seventh program instructions to determine the format of the data matches the regular expression data pattern; and
   eighth program instructions to determine, based on the format of the data matching the regular expression data pattern, the privacy policy applies to the type of the data,
   wherein the fifth, sixth, seventh, and eighth program instructions are stored on the computer readable storage device for execution by the CPU via the memory.

19. The computer system of claim 18, wherein the type of the data in the rule includes an attribute specifying a level of sensitivity of the data.

20. The computer system of claim 18, wherein the rule further associates the country and the type of the data with a locale specifying a language used in notifying the user of the privacy policy by the fourth program instructions.

* * * * *